United States Patent [19]

Fussell

[11] 3,743,857

[45] July 3, 1973

[54] SENSITIVE THRESHOLD SIGNAL DETECTOR CIRCUIT

[75] Inventor: Richard L. Fussell, Chester, Pa.

[73] Assignee: Burroughs Corporation, Detroit, Mich.

[22] Filed: Feb. 7, 1972

[21] Appl. No.: 224,044

Related U.S. Application Data

[62] Division of Ser. No. 68,177, Aug. 31, 1970, Pat. No. 3,659,208.

[52] U.S. Cl. .............................. 307/235 R, 307/291

[51] Int. Cl. .............................................. H03k 5/20

[58] Field of Search ...................... 307/235, 273, 291

[56] References Cited

UNITED STATES PATENTS

| | | | |
|---|---|---|---|
| 3,130,327 | 4/1964 | Krossa et al. | 307/273 X |
| 2,967,250 | 1/1961 | Druker et al. | 307/291 X |
| 3,084,266 | 4/1963 | Williams | 307/273 |

*Primary Examiner*—John Zazworsky
*Attorney*—Paul W. Fish, Edward J. Feeney, Jr. et al.

[57] ABSTRACT

A threshold detector circuit is disclosed which is capable of receiving an input signal of varying amplitude and of generating an output signal indicative of the passage of said input signal through a predetermined threshold level. The present circuit is especially useful in high sensitivity applications and employs a threshold switch in combination with a full latch circuit to provide a storage action. Once the latch has been set through the action of the threshold switch, it is necssary to utilize an external reset control signal to return the latch and the corresponding detector output level to its steady state condition.

5 Claims, 4 Drawing Figures

SENSITIVE THRESHOLD SIGNAL DETECTOR CIRCUIT

CROSS REFERENCE TO RELATED APPLICATIONS

This is a division of parent application Ser. No. 68,177, filed Aug. 31, 1970, which has issued as U.S. Pat. No. 3,659,208.

The threshold detector described and claimed herein is admirably suited for use in the above-mentioned systems, and can be configured to provide the basic circuit element, a threshold switch, employed in the present invention is described and claimed in application Ser. No. 679,965, now U. S. Pat. No. 3,546,482, "Signal Peak Detection System," by Clifford J. Bader and Richard L. Fussell. This application is assigned to the same assignee as the present application.

BACKGROUND OF THE INVENTION

The invention herein described was made in the course of, or under a contract with the Department of the Navy.

As taught and claimed in the reference Ser. No. 679,965 application, the signal peak detection system comprised of a plurality of threshold switches provides an output level transition when the absolute amplitude of the input signal information begins to decline after passing through a maximum level. This system is characterized by high sensitivity, self-adjustment of operating conditions, wide temperature and supply voltage tolerance and low power requirements. As such it is admirably suited for a variety of applications. However, in some applications, it has been found desirable to validate the input signal characteristics as a condition for generating an over-the-peak output indication. Ther refenence system as described does not exhibit such a capability.

In accordance with the present invention of the referenced parent application and the present division thereof, circuits and techniques are provided which considerably extend and expand the detector system of the reference application. The systems described and claimed in said parent application provide an optimum hardware and functional interface between low level, long period analog circuits and digital decision logic, thereby performing sensitive analog-to-digital conversion. Moreover both initial and final information is applied to the decision logic. The former effects signal analysis processing at an appropriate time before the signal peak occurs and the latter indicates a return to the analog steady state condition where no input signal is present. The systems described in said parent application have the capability of limiting the number of decision logic "start processing" signals to those which have a high probability of satisfying peak detection conditions. Also, the systems provide a direct information constraint to the decision logic that the input signal possesses invalid characteristics. The "digital" signal applied to the decision logic is designed to have a fast rise and fall characteristic with minimum noise content, although the analog signal may be extremely slow and incorporate significant electrical noise.

The threshold detector described and claimed herein is admirably suited for use in the above-mentioned systems, and can be configured to provide; symmetrical performance with respect to the applied analog signal. Other features of the present detector circuit include minimum dependence on semiconductor critical device parameters; and low voltage, low current operation.

SUMMARY OF THE INVENTION

A preferred embodiment of the present invention especially useful in high sensitivity systems utilizes the basic threshold switche of the referenced Ser. No. 679,965 application in combination with a full latch to provide a storage action. The latter may be implemented by a cross-coupled flip-flop. When the applied signal amplitude is such as to cause an initial threshold switching, the basic switch input stage is driven from a conducting to a nonconducting state. The latch circuit coupled to the input stage is switched from one of its stable states to its other stable state. The latch is now set independent of the subsequent condition of the input stage, and its state can only be changed by application of a reset control signal concurrently to the input stage and the latch. The presence of the reset signal in combination with the return to conduction of the input stage, peRmits the resetting of the latch circuit. In summary, the output of the threshold switching of the input stage and the response of the latch circuit, is independent of subsequent analog signal conditions which might otherwise cause the detector output to resume its initial steady-state level. Thus, the present detector circuit provides advantages which will become apparent in the detailed description of the invention which follows.

DESCRIPTION OF THE PREFERRED EMBODIMENTS

Figure 1:
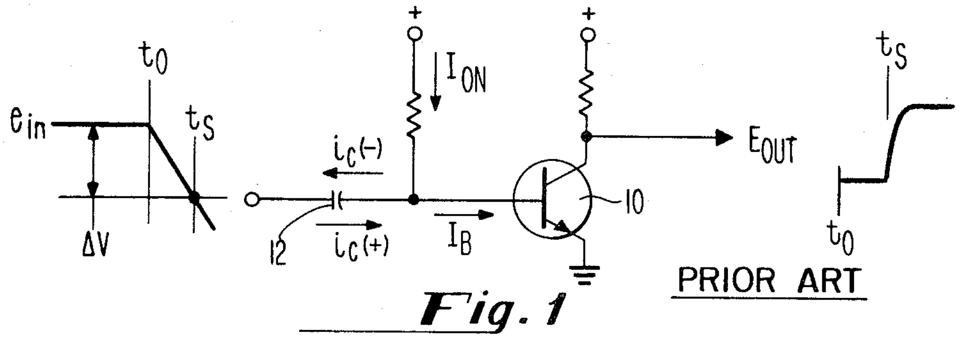
FIG. 1 is a schematic diagram of the basic threshold switch common to the present and the reference application.

The basic circuit element, the threshold switch, depicted in FIG. 1 is utilized in the present invention as well as that of the reference application. The circuit provides the capability of generating switching signals at very low analog signal amplitudes, for example, less than 10 millivolts peak, and very low frequencies, less than 0.1hz. The current consumed by the basic switch is less than 5 microamperes. Although the operation of the basic switch has been described in detail in the referenced application, it is believed helpful at this time to review its characteristics.

With reference to FIG. 1, the switching transistor 10 is normally in a conducting state in the absence of an applied analog signal $e_{in}$ as a result of a small dc bias current $I_{ON}$. The analog signal of interest is coupled to transistor 10 by way of an appropriate capacitor 12 and hence in the steady state prior to time $t_0$ results in no additional current contribution. That is, the capacitor current $i_c = 0$ where $dv/dt$ of the input signal is also equal to zero. The capacitive coupling also permits a generous tolerance for analog steady state voltage conditions over a wide dc dynamic range. At time $t_0$, the input voltage starts to go negative. The switching of transistor 10 occurs only when the analog signal begins to develop a sufficiently negative $dv/dt$. Under these conditions capacitive current,, $i_c(-) = -C\ dv/dt$ occurs and since the capacitive current is greater than the bias current $I_{ON}$ the transistor conduction can no longer be sustained and switching commences at time $t_S$. The output $E_{out}$ of the threshold switch is developed on the collector electrode of transistor 10. A knowledge of the transistor parameters defines a predictable switching point since the device will not turn off instantaneously when the base current $I_B$ becomes zero. This fact is illustrated in FIG. 1 by the negative ramp of the input signal transition voltage $\Delta V$, which results in a transistor base voltage change, $-\Delta V_{BE}$, in addition to a base current change. As a result, the precise switching conditions are $$de_{in}/dt \geq I_{ON}/C \ldots \text{and}$$

$$-\Delta V \geq V_{BE(Sw)}$$

where $V_{BE)Sw)}$ is the required device transition voltage for immediate switching. Control of the device base transition voltage requirement is best achieved by specifying the transistor collector-to-emitter saturation voltage which is a readily measurable and process-controllable parameter.

It should be noted that for an applied signal positive slope the capacitor current $i_c(+) = +C\ dv/dt$ merely adds to the bias current $I_{ON}$ thereby increasing the transistor base current and maintaining the transistor in a conducting state. It is therefore apparent that the basic circuit of FIG. 1 is substantially unresponsive to positive-going input signals.

Figure 2:
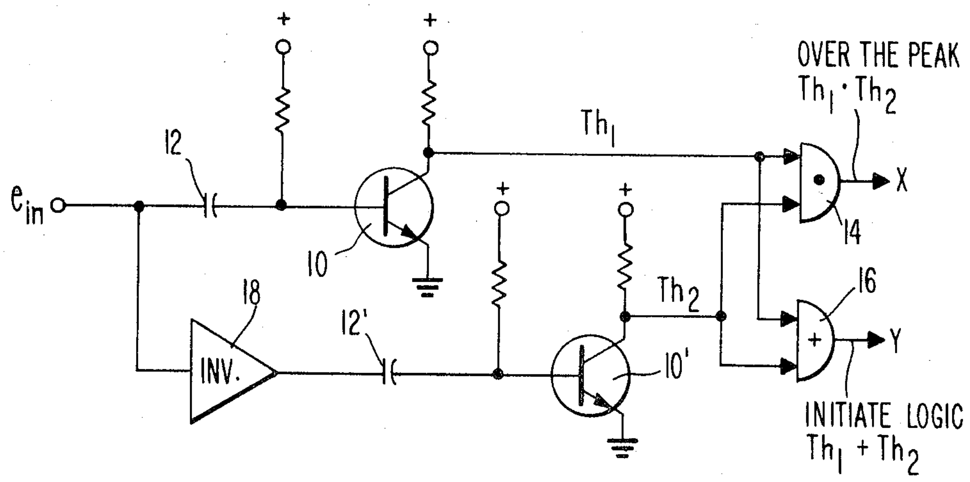
FIG. 2 is a schematic representation of a detector system utilizing the basic switch of FIG. 1 and provIding logic initiation.

FIG. 2 illustrates a system configuration utilizing the basic threshold switch of FIG. 1 and providing an over-the-peak output indication as well as a logic initiation signal. The system utilizes a pair of identical threshold switches and an analog signal inverter in addition to the AND (·) and OR (+) gating functions. It should be understood that if the source itself of the input analog signal provides the push-pull drive required by the system, the signal inverter is unnecessary and can be eliminated. If a phase-inverter circuit must be used, numerous varieties of this circuit, well known to those skilled in the electronic art, may be successfully employed. It has been found, for example, that the use of a stabilized, feedback-type, unity gain, inverting amplifier is particularly advantageous because of the inherent low output impedance and stability of such a configuration.

Figure 3:
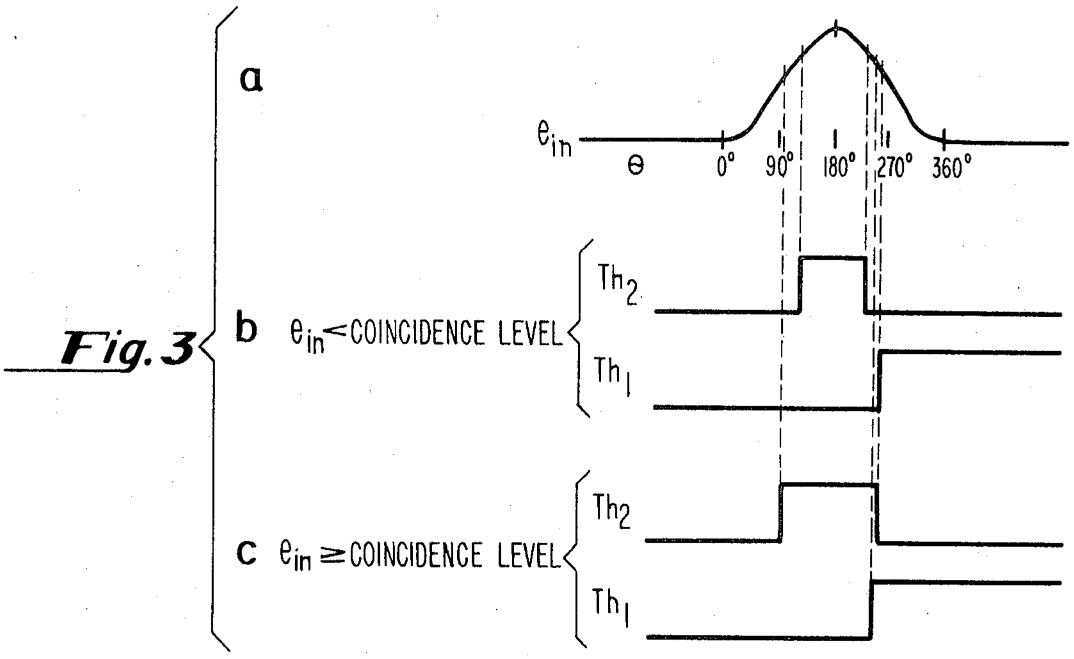
FIG. 3*a*–3*c* i'llustrate the waveforms resulting from the switching action of the threshold detector stages for different input analog signal conditions.

FIGS. 3*a*–3*c* illustrate the signal switchIng conditions which occur in the system configuration of FIG. 2 for a single peak analog signal. FIG. 3*a* illustrates a typical input signal designated $e_{in}$. The amplitude of the analog signal $e_{in}$ may be specified at any given time with reference to the angle $\theta$ covering 0° to 360°, the entire period of the input signal. The waveforms of FIG. 3*b* illustrate the switching of a pair of threshold detectors, the outputs being designated $Th_1$ and $Th_2$, for the condition where the amplitude of $e_{in}$ is less than that required to cause coincidence of the threshold switch outputs. The switching waveforms of FIG. 3*c* illustrate the coincidence of outputs of the threshold switches for an analog signal amplitude of approximately two or three times that assumed in connection with the waveforms of FIG. 3*b*.

With reference to FIGS. 2 and 3*a*–3*c*, the following circuit switching results will occur in the system of FIG. 2 for the analog signal depicted in FIG. 3*a*. For convenience, the threshold switches will be identified by their outputs, namely $Th_1$ and $Th_2$. For a steady state operation where the input signal angle $\theta$ is less than 0°. both threshold switch transistors 10 and 10' are conducting. $Th_1$ and $Th_2$ the respective outputs of the switches appearing on the collector electrodes of transistors 10 and 10' are substantially at zero level. Likewise, the outputs X and Y of AND (·) gate 14 and OR (+) gate 16 are zero.

The first threshold switching occurs when $\theta$ is larger than 0° but less than 180°. Thus, for an applied analog signal as shown in FIG. 3*a*, with a peak amplitude slightly greater than the threshold switch minimum response level, (that is $dv/dt > I_B/C$, and $-\Delta V > -\Delta V_{BE)Sw)}$) the $Th_2$ switch experiences a negative-going input via capacitor 12' by virtue of inverter 18 in the first 180° of signal $e_{in}$. The $Th_1$ switch experiences a positive-going input applied via capacitor 12. For the amplitude and $dv/dt$ conditions defined, the $Th_2$ device will thus go from a conducting state to a nonconducting state in the region of the signal 90° angle, but the $Th_1$ device will be maintained in a conducting state by the positive $dv/dt$ generated base current. The output result is that logic signal Y occurs, that is $Th_1 + Th_2 = 1$, thereby providing an initiate logic signal. However, no $Th_1$ output, or X logic signal can occur under these conditions.

A second threshold switching occurs when $\theta$ the input signal angle, is greater than 180° and less than 360°. At the signal 180° point, the threshold switch input $dv/dt$ conditions reverse and the $Th_2$ switch experiences a $+dv/dt$ input while the $Th_1$ switch experiences a $-dv/dt$ input. Hence the conditions are established to drive the $Th_1$ device to nonconduction and to return the $Th_2$ device to the conducting state. With the system configuration of FIG. 2 and the analog signal depicted in FIG. 3*a*, the conditions of FIG. 3*b* can occur, where the $Th_2$ device recovers, that is returns to the conducting state, before the $Th_1$ threshold switch assumes a nonconducting state. Thus at no time during the input signal period is there coincidence of the $Th_1$ and $Th_2$ outputs, and the X logic signal indicating an over-the-peak detection is not generated. If it is assumed that the analog signal amplitude is considerably larger than that which produced the switching conditions of FIG. 3*b*, the result shown in FIG. 3*c* will occur where the $Th_1$ device is switched to a nonconducting state before the $Th_2$ device switches back to a conducting state. This results in a coincidence of signals from the detectors $Th_1$ and $Th_2$ and an X logic signal is produced indicating an over-the-peak condition.

It is apparent from the foregoing switching considerations, that the configuration of FIG. 2, while suitable for many applications, may not possess the sensitivity required in special applications. This conduction is reflected in the switching waveforms of FIG. 3*b* where the negative excursion of the analog signal applied to threshold switch $Th_2$ is not sufficiently great to cause a delay in the recovery or return to conduction of $Th_2$, beyond the 180° point of the input signal. Such delay would have permitted switch $Th_1$ to assume a nonconducting state while $Th_2$ was still nonconducting. Such coincidence of outputs from the two nonconducting switches would have resulted in an X signal indication of an over-the-peak condition, as in the case of FIG. 3*c*.

Figure 4:
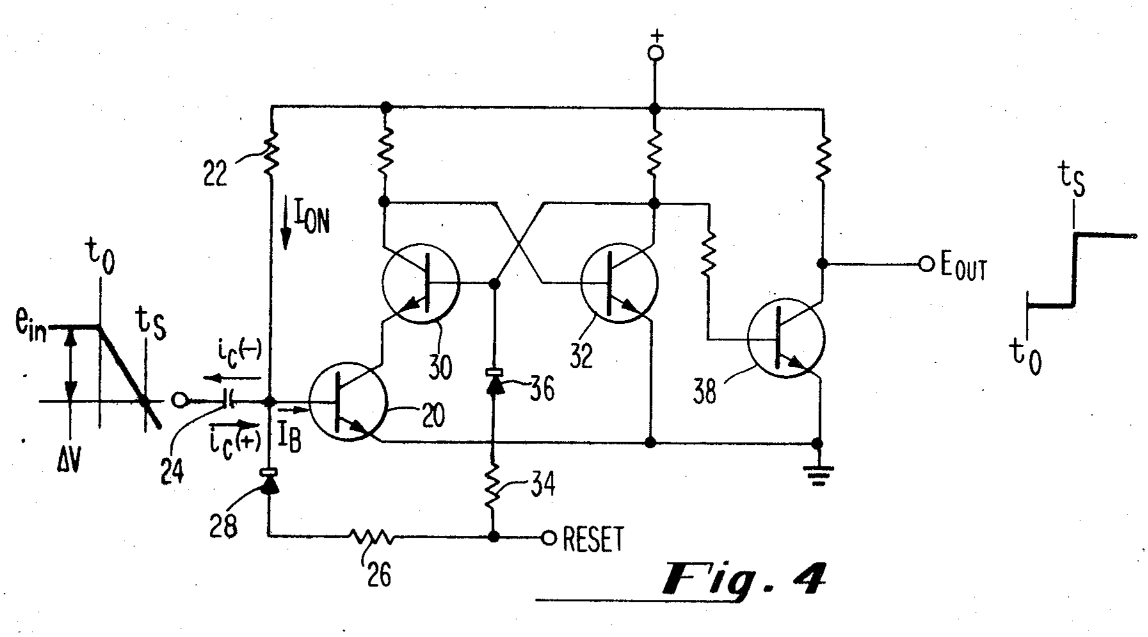
FIG. 4 is a schematic of a full-latch threshold detector device.

In order to overcome the difficulty illustrated in FIG. 3*b*, a high sensitivity threshold switch of the type illustrated in FIG. 4 may be utilized. This high sensitivity switch employs a unique latching circuit in combination with the basic threshold switch of FIG. 1. A pair of such high sensitivity threshold switches are used in the detector system depicted in the referenced parent application Ser. No. 68,177, which system provides at least the following specific advantages.

When used in the full system embodiment of said parent application, the full latch or storage action results in minimal separation between the validation or decision logic threshold (OR gate) and over-the-peak detection threshold (AND gate) providing improved system immunity to the input signal noise and drift by a factor of 2 or 3 to 1. Additionally, the circuit configuration permits a single polarity reset signal to be used on both the input threshold stage and the latching circuit. Such a configuration also provides a condition that the output will not return to steady state condition until the input threshold stage is fully reset. A minimum number of active and passive components are used in the circuit configuration and very low current operation is achieved. Another feature of the circuit configuration is that improved output switching speeds are achieved and switching chatter on very low *dv/dt* input signals is eliminated. Another advantage of the circuit configuration is that the sensitivity of the input threshold stage to parameter variations is substantially reduced.

As shown in FIG. 4, the full latch threshold detector first stage 20 is identical to the basic threshold switch previously described. The transistor steady state base bias current $I_B$ is established by resistor 22 and the + supply voltage. The capacitive current $i_c(-)$ and $i_c(+)$ are respectively subtracted from or added to the bias current as a result of the $e_{in}$ analog signal *dv/dt*. The input signal is coupled to the threshold switch via capacitor 24. An addition to the basic stage is the path for reset current by way of resistor 26 and diode 28, such that when the reset control signal is "high", a current designed to be significantly larger than $I_{ON}$ will also flow to the base of transistor 20.

It should be recalled that the basic switch steady state operation is that it is conducting and that the negative-going analog signals switch the stage to a nonconducting state. As a consequence, the presence of additional reset controlled base current will tend to return transistor 20 to its conducting, that is, steady state, condition.

Transistors 30 and 32 of FIG. 4 in combination form a cross-coupled latch or flip-flop wherein the conducting path for the transistor 30, normally conducting in steady state, is controlled by the threshold switch transistor 20, which is also conducting under steady state conditions. Transistor 32 is normally in a nonconducting state.

The circuit reset control signal also applies a current to the base of transistor 30 by way of resistor 34 and diode 36 and it will be observed that a positive reset level results in positive base current flow for transistor 30 independent of the state of transistor 32. The remaining transistor 38 is used for buffer purposes and particularly to permit transistors 30 and 32 to act as a current-mode flip-flop. Such flip-flop operation provides a minimal voltage swing at the collector electrodes of transistors 30 and 32.

Having identified the basic stages of the threshold detector of FIG. 4 and their functions, the detailed significance of the circuit design will now be shown in connection with the circuit operation comprising a switching, reset and recovery cycle. In the steady state condition prior to time $t_0$ the status of the transistor stages is as follows: transistors 20, 30 and 38 are conducting, transistor 32 is nonconducting. The conduction of transistor 38 yields an $E_{OUT}$ signal which is substantially at zero or ground potential. There is no reset signal present and the reset input is substantially at ground potential, thereby resulting in no current flow through diodes 28 or 36. At time $t_0$ a negative-going analog signal is applied to capacitor 24 at the circuit input. Transistor 20 is driven to nonconduction at time $t_S$ resulting in the turning off of transistor 30 since the emitter path of the latter transistor has been open-circuited. Transistor 32 is driven to conduction, and transistor 38, to nonconduction. $E_{OUT}$ now rises to substantially the amplitude of the + supply voltage. The transistors 30 and 32 which comprise the latch are now set independent of the state of transistor 20 and can only be changed by application of transistor 30 base input reset current in combination with the return to conduction of transistor 20. Consequently, the detector circuit state, once switched, is independent of analog signal conditions, such as the positive *dv/dt*, that would otherwise cause circuit recovery. It should be noted that when a reset control signal positive level is applied from the associated decision logic, which will be described in greater detail hereinafter, a positive base current for transistor 30 is not sufficient to change the overall circuit state alone because the conduction of transistor 30 is predominately controlled by the conduction state of transistor 20. Hence, in circuit recovery, reset current must be applied to both transistor 20 and 30, and transistor 20 must return to its steady state condition, that is, be conducting, before the transistors 30 and 32 latch circuit can transfer and the circuit output return to its corresponding steady state condition.

This latter feature is functionally useful to accomplish system demand reset in which the reset control signal duration is basically established by the signal analog conditions as reflected in the recovery time requirement of the threshold switch stage, transistor 20, itself. In practical system operation when analog signals are relatively close to switching threshold amplitude, resultant reset times are very short, whereas a large analog disturbance may result in reset and recovery period many tens of seconds long. If a worst case reset time were used, an extremely lengthy system "dead time" would result for normal signals. If a compromised fixed reset time is used, normal signal dead time would still be lengthier than necessary and unusually large signals could result in an inoperative system state.

It should be apparent from the foregoing description of the invention and its mode of operation that there is provided an improved threshold detector circuit. The circuit performs its detection function with a degree of accuracy suitable for a wide range of applications. The circuit utilizes a minimum number of components and provides very low current operation of less than 20 microamperes.

It should be understood that changes and modifications of the arrangements described herein may be required to fit particular operating requirements. These changes and modifications, in so far as they are not departures from the true scope of the present invention, are intended to be covered by the claims appended hereto.

What is claimed is:

1. A signal threshold detector comprising in combination an input terminal and an output terminal, an input stage comprising a first transistor having an emitter, a collector and a base electrode, a capacitor connecting said input terminal to the base of said first transistor, a resistor coupling the base of said first transistor to a source of supply potential, a flip-flop circuit comprising second and third transistors each having an emitter, a collector and a base electrode, the base of said second transistor being connected to the collector of said third transistor and the base of said third transistor being connected to the collector of said second transistor, a pair of resistors coupling respectively the collectors of said second and third transistors to said source of supply potential, the collector of said first transistor being connected to the emitter of said second transistor, the emitters of said first and third transistors being connected to ground potential, reset means comprising a reset terminal and a pair of current paths, each path including in series a resistor and a diode, said current paths connecting the respective bases of said first and second transistors in common to said reset terminal, an output stage comprising a fourth transistor having an emitter, a collector and a base electrode, a resistor coupling the base of said fourth transistor to the collector of said third transistor, a resistor coupling the collector of said fourth transistor to said source of supply potential, the emitter of said fourth transistor being connected to ground potential, said output terminal of said threshold detector appearing at the collector of said fourth transistor.

2. A signal threshold detector comprising in combination an input terminal and an output terminal, an input current amplifying stage and a latch circuit capable of assuming either of two stable conditions, means coupling said input stage to said latch circuit, a capacitor coupling said input terminal to said input stage, said input stage being normally in a conducting state and said latch circuit being in a first of said stable conditions, the degree of conduction of said input stage being a function of the instantaneous amplitude of an input electrical signal and the electrical charge on said capacitor, said input stage being driven to a nonconducting state by an input signal of predetermined amplitude and polarity, said latch circuit being switched to the second of said stable conditions in response to the cessation of conduction in said input stage, the change in signal level occurring on said detector output terminal in response to the switching of said latch circuit from said first to said second stable condition being indicative of the attainment of a threshold level by said input signal, said latch circuit second stable condition and the corresponding signal level on said detector output terminal being unaffected by the subsequent conduction of said input stage, reset control means coupled in common to both said input stage and to said latch circuit, said reset control means being adapted to be energized during said subsequent conduction of said input stage for switching said latch circuit from said second to said first stable condition, the signal on said detector output terminal returning to its initial level in response to the last-mentioned switching of said latch circuit.

3. A signal threshold detector as defined in claim 2 further characterized in that said input current amplifying stage has an input, an output and a control electrode, said capacitor being connected between said detector input terminal and the control electrode of said input amplifying stage, impedance means for coupling said input stage control electrode to a source of supply potential, said latch circuit comprising first and second current amplifying devices, each of said latch circuit devices having an input, an output and a control electrode, said latch circuit devices being connected in a cross-coupled flip-flop configuration wherein the control electrode of said first device is coupled to the output electrode of said second device and the control electrode of said second device is coupled to the output electrode of said first device, impedance means coupling respectively the output electrodes of said latch circuit devices to said source of supply potential, the output electrode of said input stage being connected to the input electrode of said first latch circuit device, the respective input electrodes of said input stage and said second latch circuit device being connected to a source of reference potential, said reset control means comprising a reset terminal and a pair of current paths, each path including in series impedance means and a diode, said circuit paths connecting the respective control electrodes of said input stage and said first latch circuit device in common to said reset terminal.

4. A signal threshold detector as defined in claim 3 further including an output buffer stage, said output buffer stage comprising a current amplifying device having an input, an output and a control electrode, impedance means coupling the control electrode of said output buffer stage device to the output electrode of said second latch circuit device, impedance means coupling the output electrode of said output buffer stage device to said source of supply potential, said input electrode of said output buffer stage device being connected to said source of reference potential, said output terminal of said threshold detector corresponding electrically to the output electrode of said output buffer stage device.

5. A signal threshold detector as defined in claim 4 wherein said current amplifying stages and devices are transistors of NPN conductivity type, and said input, output and control electrodes are respectively emitter, collector and base electrodes.

* * * * *